Figure 1:
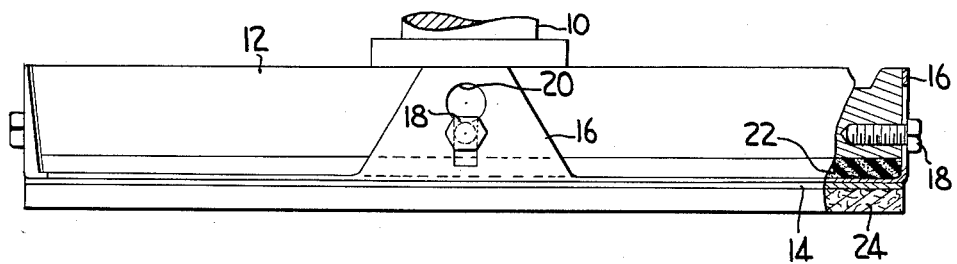

July 3, 1962     C. S. CUSICK ET AL     3,041,798

SURFACING RUNNER

Filed Oct. 1, 1959

INVENTORS
CHARLES S. CUSICK
WILLIAM R. SCHWAB and
BY ROBERT V. LANGE

Oscar H. Spencer
ATTORNEY

United States Patent Office 3,041,798
Patented July 3, 1962

3,041,798
SURFACING RUNNER
Charles S. Cusick, La Vale, Md., and William R. Schwab and Robert V. Lange, Ford City, Pa., assignors to Pittsburgh Plate Glass Company, a corporation of Pennsylvania
Filed Oct. 1, 1959, Ser. No. 843,886
6 Claims. (Cl. 51—195)

This invention relates to the surfacing of glass and in particular to a surfacing runner construction. The invention has for its primary object the provision of an improved runner construction for surfacing glass.

The invention, in its broadest aspects, comprises a glass surfacing runner constructed of a substantially circular faced runner block connected to a rotatable shaft, either driven from a driving means or received within a journal connected to a rotatable frame, a relatively thin, flexible sheet of metal having its major area the shape and size of the runner and attached to the runner, so as to have limited universal movement relative thereto, a resilient member, such as sponge rubber, of a size and shape corresponding to that of the runner block interposed between the runner block and the metal sheet, and a circular felt pad cemented to the entire face of the metal sheet. This construction allows the felt facing to follow the contour of the glass sheet being surfaced resulting in substantially even felt wear over the entire felt surface and thus an increase in felt life. The ability to follow the contour of the glass insures substantial full contact of the felt face with the glass and allows a greater load to be placed on the runner, thus decreasing the surfacing time. Because of the flexibility of the mounting, and its ability to follow the contour of the glass, digging of the felt edges into the glass is substantially eliminated, thus reducing ring cuts to a minimum. In addition to the above, the cost of refelting the runner is materially reduced because felts may be removed from the metal plate and replaced without damage to the rubber backing.

Figure 2:
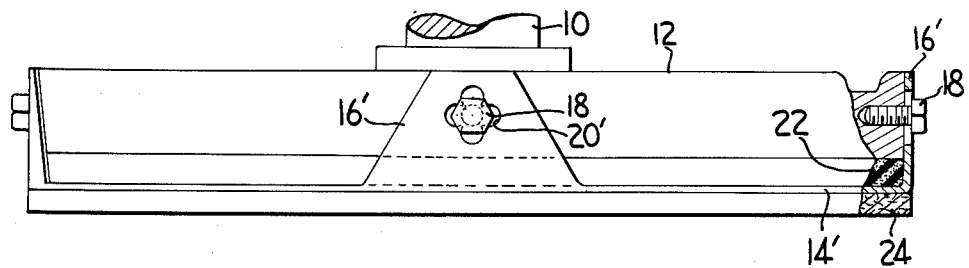

In the drawing, accompanying this specification, wherein like reference numbers refer to like parts:

FIG. 1 is a side view of the runner construction of this invention illustrating one form of sheet metal plate and its manner of fastening to the runner block; and FIG. 2 is a side view of the runner construction and illustrating another form of sheet metal plate and its manner of fastening to the runner block.

Referring to FIG. 1, there is illustrated a runner construction including a vertical shaft 10 having a substantially circular faced runner block 12 connected thereto at its lower end. The shaft may be driven or supported for rotation in a journal (not illustrated) as previously explained. A relatively thin, flexible, sheet metal plate 14, preferably of stainless steel, and having a plurality (four being shown for purposes of illustration) of upstanding lugs or ears 16 welded thereto, is loosely connected to the runner block by headed bolts 18 passing through key-hole shaped openings 20 in the lugs or ears 16 and received in suitable tapped openings in the edge of the runner block 12, thus allowing limited universal movement of the plate 14 relative to the runner block 12. A circular sheet of resilient material 22, such as sponge rubber, is interposed between the plate 14 and the runner block 12, and is cemented with suitable adhesive to the bottom surface of the block 14. A circular felt pad 24 is cemented, by suitable adhesive, to the bottom surface of the metal plate 14.

Referring to FIG. 2, there is shown the runner block 12, a thin, flexible, sheet metal plate 14' provided with upstanding lugs 16' formed integral with the plate 14'. The plate is loosely connected to the runner block by means of bolts 18 passing through openings 20' in the lugs or ears 16' and received in suitable tapped openings in the edge of the runner block 12. In this embodiment the openings 20' are of a clover-leaf contour approximating that of an epicycloid. The resilient member 22, such as sponge rubber, is disposed between the runner block 12 and the plate 14', and the felt pad 24 is cemented to the bottom of the plate 14'.

When a runner constructed as described above is lowered onto a sheet of glass having its surface to be polished perfectly plane and horizontal, the felt 24 will contact the glass surface over its entire area and the resilient material 22 will be somewhat compressed because of the weight of the runner and the load imposed thereon. A frictional driving connection is thus established between the felt and the runner block, even though the bolts 18 do not engage the extremities of the openings 20 or 20'. The plate 14 is thus not constrained from limited universal movement in the event that other surface conditions are encountered, such for example, the surface of the glass being polished is not plane and/or horizontal. The resilient material 22, by compression in parts and expansion in parts, together with the manner of connecting the plate 14 or 14' for limited universal movement to the block 12, allows the felt pad 24 to follow the contour of the glass surface which may vary along its length and fully engage the surface.

As will be obvious, the construction also compensates for the runner block being mounted for rotation about axes not exactly vertical, or not exactly in a horizontal plane. Also, the construction compensates for conveying apparatus which does not convey the glass in an exact horizontal plane.

When changing a felt pad, it is an easy matter to remove the metal plate 14, 14' from the block 12, strip the felt from its surface, and cement another felt thereto. The resilient member 22 will, if cemented to the block 12, remain thereon and if not cemented may be easily removed and replaced with the plate 14, 14' without damage.

We claim:

1. A surfacing device comprising a runner block mounted for rotation about a substantially vertical axis and in a substantially horizontal plane, a relatively thin and flexible metal plate connected to said block for limited universal movement therebetween, a resilient member interposed between said block and said plate and covering substantially the entire face of said runner block and a surfacing means adhered to said plate.

2. A surfacing runner construction for polishing glass comprising, a substantially circular faced runner block mounted for rotation about a substantially vertical and in a substantially horizontal plane, a relatively thin and flexible substantially circular metal plate positioned adjacent said runner block, said plate having a plurality of substantially vertically extending ears, means cooperating with said ears for connecting said plate to said runner for limited universal movement therebetween, a substantially circular resilient member positioned between said runner block and said plate and covering substantially the entire face of said runner block, and a polishing felt cemented to said plate for engagement with the glass.

3. A surfacing runner construction as recited in claim 2 wherein said connecting means includes an opening in each ear and a bolt passing through each opening and into said runner block.

4. A surfacing runner construction as recited in claim 3 wherein each bolt has a diameter less than the dimensions of each opening.

5. A surfacing runner construction as recited in claim 3 wherein said openings are key-hole shaped in outline.

6. A surfacing runner construction as recited in claim 3 wherein said openings are epicycloid-shaped in outline.

References Cited in the file of this patent

UNITED STATES PATENTS

| | | |
|---|---|---|
| 2,554,311 | Place | May 22, 1951 |
| 2,713,757 | Brennecke | July 26, 1955 |
| 2,883,805 | Limbers | Apr. 28, 1959 |